(12) United States Patent
Kurakane et al.

(10) Patent No.: US 10,553,902 B2
(45) Date of Patent: *Feb. 4, 2020

(54) NONAQUEOUS ELECTROLYTE SECONDARY BATTERY INSULATING POROUS LAYER

(71) Applicant: Sumitomo Chemical Company, Limited, Tokyo (JP)

(72) Inventors: Kosuke Kurakane, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 15/593,413

(22) Filed: May 12, 2017

(65) Prior Publication Data
US 2018/0301755 A1   Oct. 18, 2018

(30) Foreign Application Priority Data
Apr. 14, 2017   (JP) .................... 2017-080831

(51) Int. Cl.
| H01M 2/16 | (2006.01) |
| H01M 10/0565 | (2010.01) |
| H01M 10/052 | (2010.01) |

(52) U.S. Cl.
CPC ....... *H01M 10/0565* (2013.01); *H01M 2/162* (2013.01); *H01M 2/1653* (2013.01); *H01M 2/1673* (2013.01); *H01M 2/1686* (2013.01); *H01M 10/052* (2013.01)

(58) Field of Classification Search
CPC ............ H01M 2/1673; H01M 2/1653; H01M 2/1686; H01M 2/162; H01M 10/052
See application file for complete search history.

(56) References Cited

U.S. PATENT DOCUMENTS

| 2007/0048607 | A1* | 3/2007 | Nakashima | ........... H01M 2/166 429/209 |
| 2010/0124708 | A1 | 5/2010 | Matsui et al. | |
| 2011/0212358 | A1* | 9/2011 | Usami | ...................... B32B 5/32 429/145 |
| 2011/0262796 | A1 | 10/2011 | Shimooka et al. | |
| 2012/0295164 | A1 | 11/2012 | Nakano et al. | |
| 2013/0034769 | A1 | 2/2013 | Takagi et al. | |
| 2017/0033348 | A1* | 2/2017 | Murakami | .......... H01M 2/1686 |
| 2017/0162849 | A1 | 6/2017 | Murakami et al. | |
| 2017/0229698 | A1* | 8/2017 | Mizuno | ................. H01M 2/166 |
| 2017/0263907 | A1 | 9/2017 | Ameyama et al. | |
| 2017/0282513 | A1* | 10/2017 | Sugata | .................... B29C 47/06 |
| 2017/0301903 | A1 | 10/2017 | Choi et al. | |

FOREIGN PATENT DOCUMENTS

| CN | 102781667 A | 11/2012 |
| EP | 2388846 A1 | 11/2011 |
| JP | 2004-39492 A | 2/2004 |
| JP | 2011-113921 A | 6/2011 |
| JP | 201287223 A | 5/2012 |
| JP | 4972253 B2 | 7/2012 |
| JP | 2012216426 A | 11/2012 |
| KR | 20100055338 A | 5/2010 |
| KR | 20110118075 A | 10/2011 |
| KR | 20160088434 A | 7/2016 |
| KR | 20160094846 A | 8/2016 |
| KR | 20170117732 A | 10/2017 |
| WO | 2011077564 A1 | 6/2011 |
| WO | 2016158927 A1 | 10/2016 |

OTHER PUBLICATIONS

Office Action dated Mar. 1, 2019 in CN Office Action Application No. 201810175450.2.
Office Action dated Mar. 22, 2018 in KR Application No. 2018-0025177.
Office Action dated Jul. 16, 2018 in KR Application No. 2018-0025177.
Office Action dated Nov. 27, 2018 in JP Application No. 2018-039041 (Partial English Translation).
Office Action dated Jan. 2, 2019 in U.S. Appl. No. 15/910,680 by Kurakane.
Office Action dated Sep. 10, 2019 in CN Application No. 201810175450.2.
Office Action dated Jul. 10, 2019 in U.S. Appl. No. 15/910,680, by Kurakane.

* cited by examiner

Primary Examiner — Muhammad S Siddiquee
(74) Attorney, Agent, or Firm — Panitch Schwarze Belisario & Nadel LLP

(57) ABSTRACT

A nonaqueous electrolyte secondary battery insulating porous layer usable as a member of a nonaqueous electrolyte secondary battery having an excellent cycle characteristic is provided. A nonaqueous electrolyte secondary battery insulating porous layer includes a thermoplastic resin, porosity of the nonaqueous electrolyte secondary battery insulating porous layer being not less than 25% and not more than 80%, and a ratio of a displacement amount of the nonaqueous electrolyte secondary battery insulating porous layer at tenth loading-unloading cycle to a displacement amount of the nonaqueous electrolyte secondary battery insulating porous layer at fiftieth loading-unloading cycle being not less than 100% and less than 115%.

6 Claims, 1 Drawing Sheet

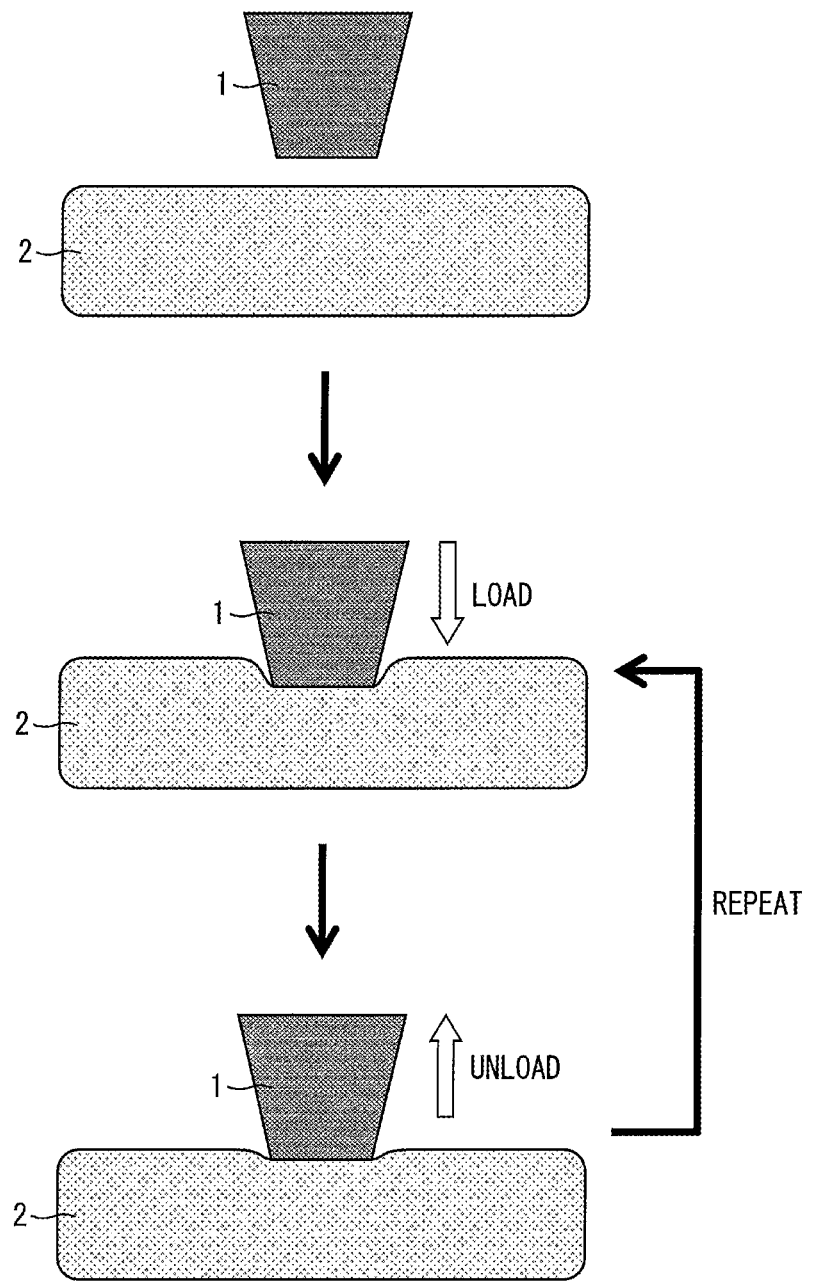

ated application claims priority under 35 U.S.C. § 119 on Patent Application No. 2017-080831 filed in Japan on Apr. 14, 2017, the entire contents of which are hereby incorporated by reference.

NONAQUEOUS ELECTROLYTE SECONDARY BATTERY INSULATING POROUS LAYER

This Nonprovisional application claims priority under 35 U.S.C. § 119 on Patent Application No. 2017-080831 filed in Japan on Apr. 14, 2017, the entire contents of which are hereby incorporated by reference.

TECHNICAL FIELD

The present invention relates to (i) an insulating porous layer for a nonaqueous electrolyte secondary battery (hereinafter referred to as a "nonaqueous electrolyte secondary battery insulating porous layer"), (ii) a laminated separator for a nonaqueous electrolyte secondary battery (hereinafter referred to as a "nonaqueous electrolyte secondary battery laminated separator"), (iii) a member for a nonaqueous electrolyte secondary battery (hereinafter referred to as a "nonaqueous electrolyte secondary battery member"), and (iv) a nonaqueous electrolyte secondary battery.

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

An example of a separator known to be used for such a nonaqueous electrolyte secondary battery is a laminated separator in which a porous layer containing a filler and a resin is disposed on at least one surface of a porous base material containing polyolefin as a main component.

For example, Patent Literature 1 discloses that a microporous film having (i) compression characteristics such as a particular compression deformation amount and a particular compression deformation growth rate and (ii) a particular pore ratio (porosity) can be used as a battery separator which is excellent in an output characteristic and durability of a battery.

CITATION LIST

Patent Literature

[Patent Literature 1]
Japanese Patent Application Publication No. 2012-87223 (published on May 10, 2012)

SUMMARY OF INVENTION

Technical Problem

"Compression deformation amount" described in Patent Literature 1 is a deformation amount of a microporous film when a load is applied thereto for the first time in a case of repeatedly subjecting the microporous film to a loading-unloading cycle. "Compression deformation growth rate" described in Patent Literature 1 is a value based on a difference between (i) an amount of deformation of a microporous film when a load is applied thereto for the first time and (ii) an amount of deformation of the microporous film when a load is applied thereto for the tenth time. This value corresponds to a short-term charge-discharge cycle.

However, Patent Literature 1 does not disclose a growth rate of "compression deformation amount" in a case where a loading-unloading cycle is repeated more than ten times (repetition of the loading-unloading cycle more than ten times corresponds to a long-term charging-discharging cycle). Furthermore, Patent Literature 1 does not disclose relevance between a compression characteristic and a cycle characteristic. A conventional battery separator, such as one disclosed in Patent Literature 1, does not exhibit a sufficient battery output characteristic, i.e. a cycle characteristic when a long-term charging-discharging cycle is repeated.

Solution to Problem

The present invention includes the following [1] through [4]:
[1] A nonaqueous electrolyte secondary battery insulating porous layer including a thermoplastic resin, porosity of the nonaqueous electrolyte secondary battery insulating porous layer being not less than 25% and not more than 80%, and a ratio of a displacement amount of the nonaqueous electrolyte secondary battery insulating porous layer at tenth loading-unloading cycle to a displacement amount of the nonaqueous electrolyte secondary battery insulating porous layer at fiftieth loading-unloading cycle being not less than 100% and less than 115%.
[2] A nonaqueous electrolyte secondary battery laminated separator including: a polyolefin porous film; and a nonaqueous electrolyte secondary battery insulating porous layer recited in [1].
[3] A nonaqueous electrolyte secondary battery member including: a cathode; a nonaqueous electrolyte secondary battery insulating porous layer recited in [1], or a nonaqueous electrolyte secondary battery laminated separator recited in [2]; and an anode, the cathode, the nonaqueous electrolyte secondary battery insulating porous layer or the nonaqueous electrolyte secondary battery laminated separator, and the anode being arranged in this order.
[4] A nonaqueous electrolyte secondary battery including: a nonaqueous electrolyte secondary battery insulating porous layer recited in [1]; or a nonaqueous electrolyte secondary battery laminated separator recited in [2].

Advantageous Effects of Invention

The nonaqueous electrolyte secondary battery insulating porous layer in accordance with an embodiment of the present invention yields an effect of exhibiting a high capacity maintenance ratio and an excellent cycle characteristic, in a case where a charging-discharging cycle is repeated in a nonaqueous electrolyte secondary battery including the nonaqueous electrolyte secondary battery insulating porous layer.

BRIEF DESCRIPTION OF DRAWINGS

FIG. 1 is a schematic view illustrating a loading-unloading cycle in the present invention.

DESCRIPTION OF EMBODIMENTS

The following description will discuss an embodiment of the present invention. Note, however, that the present invention is not limited to this embodiment. Note that the present invention is not limited to configurations described below, but can be altered in many ways by a person skilled in the art within the scope of the Claims. An embodiment derived from a proper combination of technical means disclosed in different embodiments is also encompassed in the technical scope of the present invention. Note that unless specified otherwise, any numerical range expressed as "A to B" herein means "not less than A and not greater than B".

Embodiment 1: Nonaqueous Electrolyte Secondary Battery Insulating Porous Layer

A nonaqueous electrolyte secondary battery insulating porous layer (hereinafter also referred to as merely "porous layer") in accordance with Embodiment 1 of the present invention is a nonaqueous electrolyte secondary battery insulating porous layer which includes a thermoplastic resin, and which is configured such that (i) a porosity is not less than 25% and not more than 80%, and (ii) a ratio of a displacement amount at a loading-unloading cycle for the tenth time to displacement amount at a loading-unloading cycle for the fiftieth time (hereinafter also referred to as merely "displacement ratio") is not less than 100% and less than 115%.

The "displacement amount at a loading-unloading cycle" and "displacement ratio" of the nonaqueous electrolyte secondary battery insulating porous layer in accordance with an embodiment of the present invention can be measured by a method described below.

As illustrated in FIG. 1, a measurement sample 2 is obtained by cutting out a square having a side of 1 cm from a porous layer or a nonaqueous electrolyte secondary battery laminated separator obtained by disposing a porous layer on a substrate. The measurement sample 2 is fixed onto a sample table with use of an adhesive (liquid glue), and a planar presser 1 (made of a diamond) of 50 μm in diameter is pushed at a speed of 0.4877 mN/sec. into the measurement sample 2 to reach a depth corresponding to a load of 1 mN from a surface of the measurement sample 2 (loading). Immediately thereafter, without providing a hold time, the planar presser 1 is pulled back, at a speed of 0.4877 mN/sec., to the surface of the measurement sample 2 where the load is 0 mN (unloading). Here, "load" indicates a stress which the planar presser 1 receives from the measurement sample 2 when the planar presser 1 is pushed into the measurement sample 2.

A cycle of applying a load to the measurement sample 2 and immediately thereafter removing the load (herein referred to as "loading-unloading cycle") is repeated 50 times. At the tenth loading-unloading cycle of the measurement sample 2, a distance between (i) a depth by which the planar presser 1 is pushed into the measurement sample 2 and (ii) a location on the surface of the measurement sample 2 at which location a load is 0 mN when the planar presser 1 is pulled back is measured. This distance is regarded as a displacement amount (unit: μm) in the tenth loading-unloading cycle. Similarly, at the fiftieth loading-unloading cycle of the measurement sample 2, a distance between (i) a depth by which the planar presser 1 is pushed into the measurement sample 2 and (ii) a location on the surface of the measurement sample 2 at which location a load is 0 mN when the planar presser 1 is pulled back is measured. This distance is regarded as a displacement amount (unit: μm) in the fiftieth loading-unloading cycle.

Here, "surface" indicates a location where a load was 0 mN at the end of the unloading in the previous loading-unloading cycle.

The displacement ratio is calculated from (i) a displacement amount at the tenth loading-unloading cycle measured as above and (ii) a displacement amount at the fiftieth loading-unloading cycle measured as above.

As described above, a force (load) applied to the measurement sample 2 when measuring the "displacement amount at a loading-unloading cycle" and the "displacement ratio" is as small as 1 mN. Consequently, also in a case where the measurement sample 2 is cut from the nonaqueous electrolyte secondary battery laminated separator, the load is applied to the porous layer which is a surface layer of the nonaqueous electrolyte secondary battery laminated separator. That is, both in a case where the measurement sample 2 is cut from the porous layer and a case where the measurement sample 2 is cut from the nonaqueous electrolyte secondary battery laminated separator, a load is applied to a porous layer, and consequently the "displacement amount at a loading-unloading cycle" and the "displacement ratio" of the porous layer is measured.

The nonaqueous electrolyte secondary battery insulating porous layer in accordance with an embodiment of the present invention (i) can be, as a member constituting a nonaqueous electrolyte secondary battery laminated separator, in contact with an electrode in a nonaqueous electrolyte secondary battery, or (ii) can be disposed on an electrode so as to be located between the electrode and a nonaqueous electrolyte secondary battery separator.

In a nonaqueous electrolyte secondary battery, active materials of electrodes (a cathode active material and an anode active material) change their volumes in charging and discharging. Accordingly, electrodes (a cathode and an anode) also expand and contract in accordance with charging and discharging. Consequently, repeating a charging-discharging cycle causes a porous layer to be repeatedly subjected to a stress (load) due to expansion of the electrodes and the load and unload due to contraction of the electrodes.

Repeating the loading-unloading cycle to the porous layer plural times causes the porous layer to be plastically deformed due to a repeatedly applied load. Accordingly, repeating the loading-unloading cycle causes the aforementioned distance by which the planar presser 1 is pulled back in unloading in particular to be shortened gradually, resulting in decrease in a displacement amount at the loading-unloading cycle.

Therefore, in the porous layer in accordance with an embodiment of the present invention, the lower limit of the displacement ratio is 100%.

The displacement ratio being less than 115% in the porous layer in accordance with an embodiment of the present invention indicates that the degree of plastic deformation of the porous layer is small in a case where a long-term charging-discharging cycle is repeated. The degree of the plastic deformation being large increases a difference between (i) the expansion and contraction of electrodes and (ii) deformation of the porous layer in repetition of the long-term charging-discharging cycle, resulting in occurrence of a gap between the porous layer and the electrodes. In this case, there is a possibility that a product, a gas etc. derived from decomposition of the electrolyte etc. is accumulated in the gap between the porous layer and the electrodes, resulting in deterioration in battery characteristics such as a cycle characteristic. The displacement ratio being less than 115% can subdue such occurrence of a gap and deterioration in battery characteristics. For this reason, the displacement ratio is preferably not more than 114%, and more preferably not more than 110%.

On the other hand, the displacement ratio being low indicates that the displacement amount of the porous layer hardly changes in a case of repeating the charging-discharging cycle.

As described above, in the nonaqueous electrolyte secondary battery, a product, a gas etc. are generated from decomposition of the electrolyte etc. The product, the gas etc. increase irreversibly. In a case where the displacement ratio is too small, the porous layer is hardly deformed plastically, so that the stress generated due to generation of the product, the gas etc. is permanently applied to the electrodes and the porous layer. This may cause a change in electrode structure etc., resulting in deterioration in battery characteristics such as a cycle characteristic. For this reason, the displacement ratio is preferably not less than 103%, and more preferably not less than 105%.

With respect to the porous layer in accordance with an embodiment of the present invention, the "displacement amount at the tenth loading-unloading cycle" is preferably not less than 0.05 µm and not more than 0.20 µm, and more preferably not less than 0.08 µm and not more than 0.15 µm. With respect to the porous layer in accordance with an embodiment of the present invention, the "displacement amount at the fiftieth loading-unloading cycle" is preferably not less than 0.05 µm and not more than 0.20 µm, and more preferably not less than 0.08 µm and not more than 0.15 µm.

The porous layer in accordance with an embodiment of the present invention can be disposed on at least one surface of a base material. Examples of the base material include a base material constituting the nonaqueous electrolyte secondary battery laminated separator (hereinafter also referred to as "porous base material") and an electrode. An example of the porous base material is a polyolefin porous film.

The porous layer in accordance with an embodiment of the present invention can be used preferably as a constituent member of a nonaqueous electrolyte secondary battery laminated separator in accordance with a later-mentioned embodiment of the present invention. Specifically, the porous layer in accordance with an embodiment of the present invention can form a nonaqueous electrolyte secondary battery laminated separator in accordance with an embodiment of the present invention by being disposed on one surface or both surfaces of a polyolefin porous film as a porous base material.

The porous layer in accordance with an embodiment of the present invention includes a thermoplastic resin. The porous layer has many pores therein, the pores being connected to one another, so that a gas or a liquid can pass through the porous layer from one surface of the porous layer to the other. In a case where the porous layer in accordance with an embodiment of the present invention is used as a constituent member of a nonaqueous electrolyte secondary battery laminated separator, the porous layer can serve as an outermost layer of the laminated separator, the outermost layer coming into contact with an electrode.

<Thermoplastic Resin>

The thermoplastic resin to be included in the porous layer is preferably insoluble in an electrolyte solution of a battery and is preferably electrochemically stable when the battery is in normal use. Specific examples of the thermoplastic resin encompass: polyolefins such as polyethylene, polypropylene, polybutene, and an ethylene-propylene copolymer; fluorine-containing resins such as polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetraflu or oethylene copolymer, a vinylidene fluoride-trifluoro ethylene copolymer, a vinylidene fluoride-trichloroethylene copolymer, a vinylidene fluoride-vinyl fluoride, a vinylidene fluoride-hexafluoropropylene-tetrafluoroethylene copolymer, and an ethylene-tetrafluoroethylene copolymer, and any of these fluorine-containing resins which is a fluorine-containing rubber having a glass transition temperature of equal to or less than 23° C.; aromatic polymers; polycarbonate; polyacetal; rubbers such as a styrene-butadiene copolymer and a hydride thereof, a methacrylic acid ester copolymer, an acrylonitrile-acrylic acid ester copolymer, a styrene-acrylic acid ester copolymer, ethylene propylene rubber, and polyvinyl acetate; resins with a melting point or glass transition temperature of not lower than 180° C. such as polysulfone and polyester; water-soluble polymers such as polyvinyl alcohol, polyethylene glycol, cellulose ether, sodium alginate, polyacrylic acid, polyacrylamide, and polymethacrylic acid.

The thermoplastic resin included in the porous layer in accordance with an embodiment of the present invention is preferably an aromatic polymer. Note that "aromatic polymer" herein refers to a polymer in which a structural unit constituting a main chain contains an aromatic ring. That is, "aromatic polymer" means that monomers which are a raw material of the thermoplastic resin contain aromatic compounds.

Specific examples of the aromatic polymer encompass aromatic polyamide, aromatic polyimide, aromatic polyester, aromatic polycarbonate, aromatic polysulfone, and aromatic polyether. Preferable examples of the aromatic polymer encompass aromatic polyamide, aromatic polyimide, and aromatic polyester. The aromatic polymer is preferably a wholly aromatic polymer in which a main chain has no aliphatic carbon.

Common names of polymers described herein each indicate a main binding type of the polymer. For example, in a case where a polymer contained in the thermoplastic resin in accordance with an embodiment of the present invention is an aromatic polymer referred to as "aromatic polyester", "aromatic polyester" indicates that not less than 50% of bonds constituting a main chain in molecules of the aromatic polymer are ester bonds. It should be noted that the aromatic polymer referred to as "aromatic polyester" can contain, in bonds constituting a main chain, bonds other than ester bonds (such as amide bonds and imide bonds).

The thermoplastic resin contained in the porous layer in accordance with an embodiment of the present invention can be a single type of resin or a mixture of two or more types of resins.

Examples of the aromatic polyamide encompass: wholly aromatic polyamides such as para-aramid and meta-aramid; semi-aromatic polyamide; 6T nylon; 6I nylon; 8T nylon; 10T nylon; denatured 6T nylon; denatured 6I nylon; denatured 8T nylon; denatured 10T nylon; copolymers of these; and the like.

The aromatic polyimide is preferably a wholly aromatic polyimide prepared through condensation polymerization of an aromatic dianhydride and an aromatic diamine. Specific examples of the dianhydride encompass pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyl tetracarboxylic dianhydride. Specific examples of the diamine encompass, but are not limited to, oxydianiline, paraphenylenediamine, benzophenone diamine, 3,3'-methylenedianiline, 3,3'-diaminobenzophenone, 3,3'-diaminodiphenyl sulfone, and 1,5'-naphthalene diamine. In the present invention, polyimide soluble in a solvent is used preferably. Examples of such polyimide encompass a polyimide that is a polycondensate obtained from 3,3',4,4'-diphenyl sulfone tetracarboxylic dianhydride and aromatic diamine.

Examples of the aromatic polyester encompass the following polyesters. These aromatic polyesters are preferably wholly aromatic polyesters.

(1) A polymer obtained by polymerizing an aromatic hydroxycarboxylic acid, an aromatic dicarboxylic acid, and an aromatic diol,
(2) A polymer obtained by polymerizing aromatic hydroxycarboxylic acids of identical type or differing types,
(3) A polymer obtained by polymerizing an aromatic dicarboxylic acid and an aromatic diol,
(4) A polymer obtained by polymerizing (i) an aromatic hydroxycarboxylic acid, (ii) an aromatic dicarboxylic acid, and (iii) an aromatic amine having a phenolic hydroxide group,
(5) A polymer obtained by polymerizing (i) an aromatic dicarboxylic acid and (ii) an aromatic amine having a phenolic hydroxide group,
(6) A polymer obtained by polymerizing an aromatic hydroxycarboxylic acid, an aromatic dicarboxylic acid, and an aromatic diamine,
(7) A polymer obtained by polymerizing an aromatic hydroxycarboxylic acid, an aromatic dicarboxylic acid, an aromatic diamine, and an aromatic diol,
(8) A polymer obtained by polymerizing (i) an aromatic hydroxycarboxylic acid, (ii) an aromatic dicarboxylic acid, (iii) an aromatic amine having a phenolic hydroxide group, and (iv) an aromatic diol.

Of the aromatic polyesters above, the aromatic polyesters of (4) through (7) or (8) are preferable in view of solubility in a solvent. Excellent solubility in a solvent allows an increase in productivity of a porous layer.

Note that instead of using an aromatic hydroxycarboxylic acid, aromatic dicarboxylic acid, an aromatic diol, an aromatic diamine, or an aromatic amine having a phenolic hydroxide group, it is possible to use (i) an ester-forming derivative of any of these or (ii) an amide-forming derivative of any of these.

Examples of the ester-forming derivatives of carboxylic acids and amide-forming derivatives of carboxylic acids encompass (i) compounds, such as an acid chloride and an acid anhydride, in each of which a carboxyl group is a highly reactive derivative so that a polyester formation reaction or a polyamide formation reaction is promoted (ii) compounds in each of which an ester or an amide is formed by a carboxyl group and alcohols, an ethylene glycol, or an amine, any of which generates an polyester or a polyamide by an ester exchange reaction or an amide exchange reaction, respectively, and (iii) the like.

Examples of the ester-forming derivative of the phenolic hydroxide group encompass (i) a compound in which an ester is formed by a phenolic hydroxide group and carboxylic acids so as to generate polyester by an ester exchange reaction, and (ii) the like.

Examples of an amide-forming derivative of an amino group encompass (i) a compound in which an amide is formed by an amino group and carboxylic acids so as to generate polyamide by an amide exchange reaction, and (ii) the like.

Alternatively, the aromatic hydroxycarboxylic acid, the aromatic dicarboxylic acid, the aromatic diol, the aromatic amine having a phenolic hydroxide group, and the aromatic diamine can each be substituted by an alkyl group such as a methyl group or an ethyl group or by an aryl group such as a phenyl group, provided that an ester forming property or an amide forming property is not impaired.

Examples of a repeating structural unit of the wholly aromatic polyester encompass, but are not limited to, the following repeating structural units.

A repeating structural unit derived from an aromatic hydroxycarboxylic acid:

[Chem. 1]

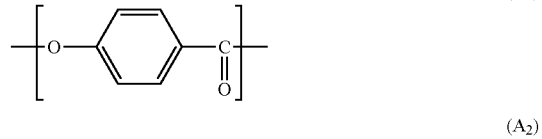

(A₁)

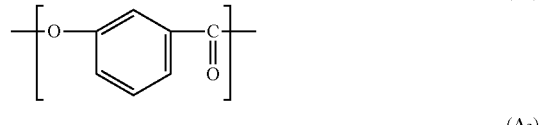

(A₂)

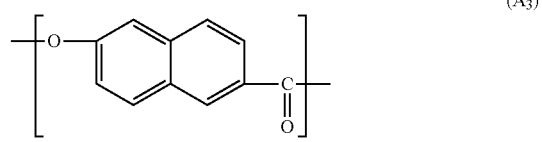

(A₃)

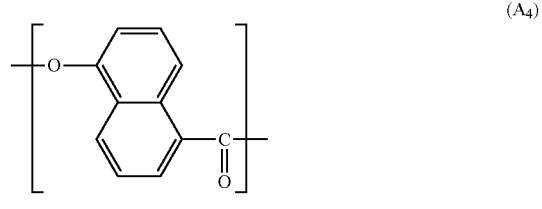

(A₄)

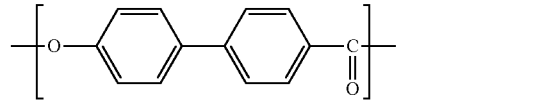

(A₅)

The above repeating structural unit can be substituted by an alkyl group or an aryl group.

A repeating structural unit derived from an aromatic dicarboxylic acid:

[Chem. 2]

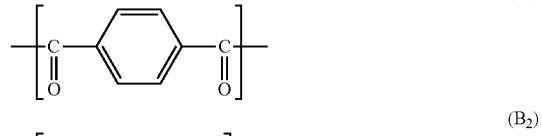

(B₁)

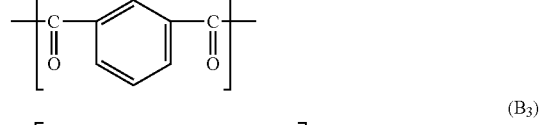

(B₂)

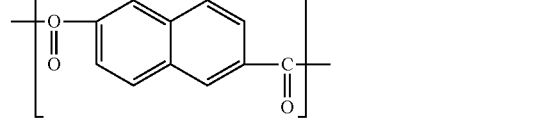

(B₃)

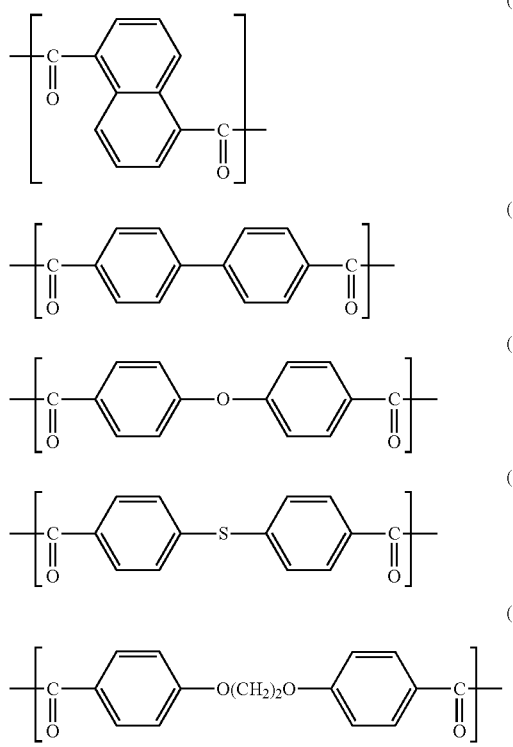
The above repeating structural unit can be substituted by an alkyl group or an aryl group.
A repeating structural unit derived from an aromatic diol:
[Chem. 3]
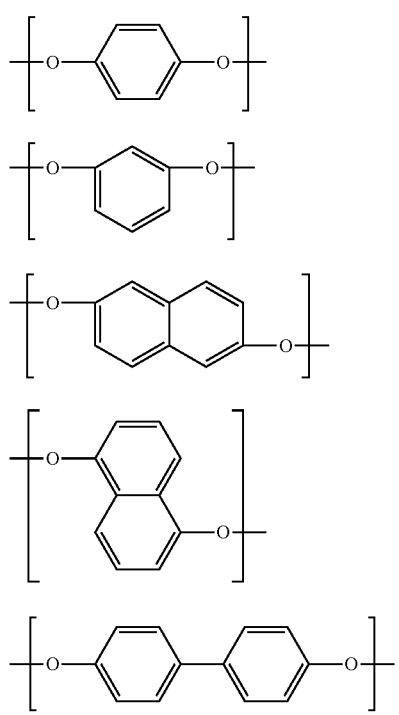
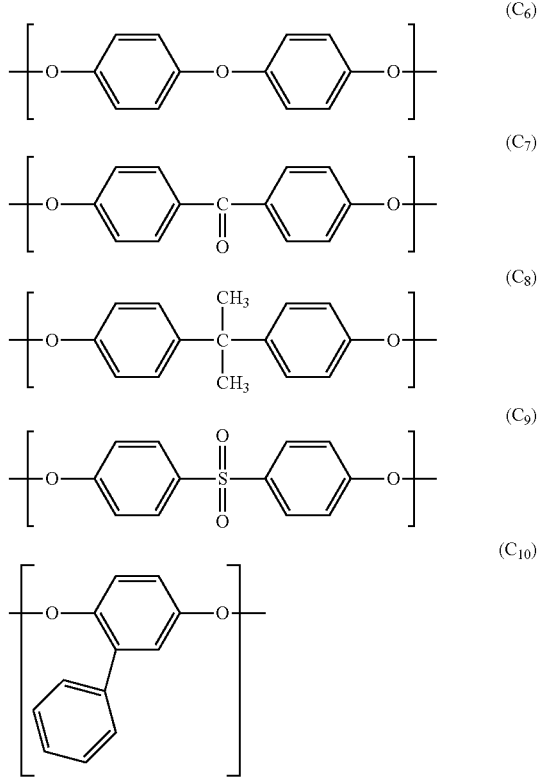
The above repeating structural unit can be substituted by an alkyl group or an aryl group.
A repeating structural unit derived from an aromatic amine having a phenolic hydroxide group:
[Chem. 4]
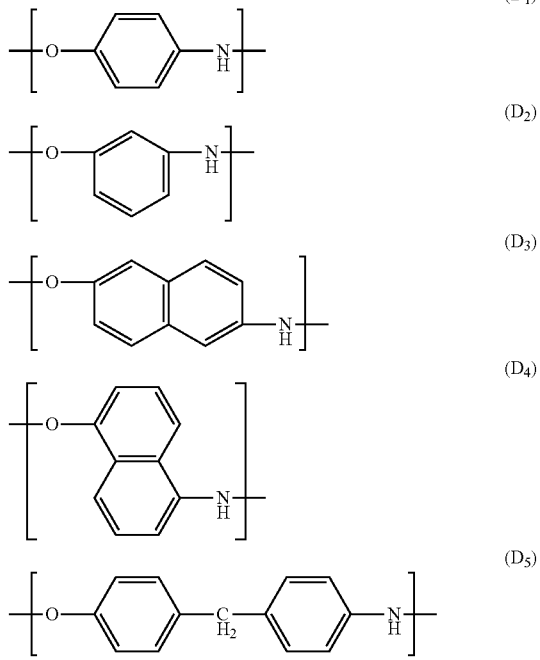

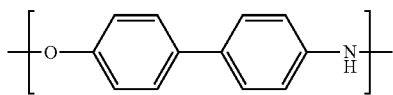
(D$_6$)

The above repeating structural unit can be substituted by an alkyl group or an aryl group. All or part of hydrogen atoms binding to nitrogen atoms can be substituted by an alkyl group or an acyl group.

A repeating structural unit derived from an aromatic diamine:

[Chem. 5]

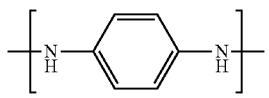
(E$_1$)

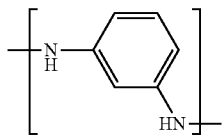
(E$_2$)

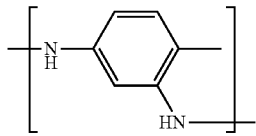
(E$_3$)

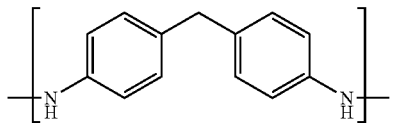
(E$_4$)

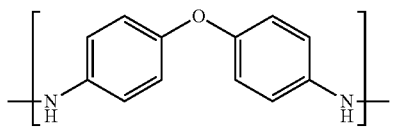
(E$_5$)

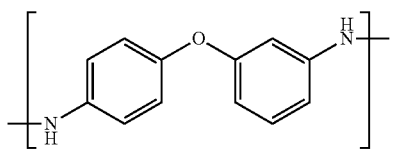
(E$_6$)

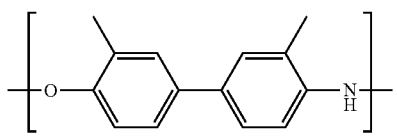
(E$_7$)

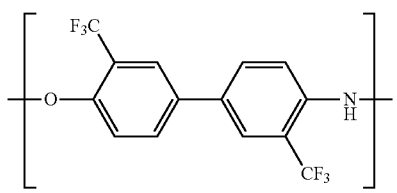
(E$_8$)

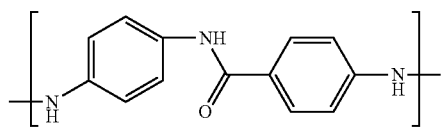
(E$_9$)

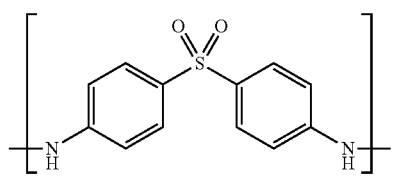
(E$_{10}$)

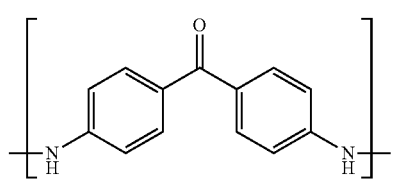
(E$_{11}$)

The above repeating structural unit can be substituted by a halogen atom, an alkyl group or an aryl group.

Ordinarily, the alkyl group, by which the repeating structural unit can be substituted, is, for example, a C1-C10 alkyl group which is preferably a methyl group, an ethyl group, a propyl group, or a butyl group. Ordinarily, the aryl group, by which the repeating structural unit can be substituted, is, for example, a C6-C20 aryl group which is preferably a phenyl group. All or part of hydrogen atoms binding to nitrogen atoms can be substituted by an alkyl group or an acyl group. Examples of the halogen atom by which the repeating structural unit can be substituted encompass a fluorine atom, a chlorine atom, and a bromine atom.

In view of a further increase in heat resistance of the nonaqueous electrolyte secondary battery laminated separator in accordance with an embodiment of the present invention, the aromatic polyester preferably contains a repeating unit represented by the above formula (A$_1$), (A$_3$), (B$_1$), (B$_2$) or (B$_3$).

Examples of a preferable combination of the repeating structural units encompass the following combinations (a) through (d):

(a):
a combination of the repeating structural units (A$_1$), (B$_2$), and (D$_1$),
a combination of the repeating structural units (A$_3$), (B$_2$), and (D$_1$),
a combination of the repeating structural units (A$_1$), (B$_1$), (B$_2$), and (D$_1$),
a combination of the repeating structural units (A$_3$), (B$_1$), (B$_2$), and (D$_1$),
a combination of the repeating structural units (A$_3$), (B$_3$), and (D$_1$), or
a combination of the repeating structural units (B$_1$), (B$_2$) or (B$_3$), and (D$_1$).

(b): a combination in which all or part of (D$_1$) in the combination (a) is substituted by (D$_2$).

(c): a combination in which part of (A$_1$) in the combination (a) is substituted by (A$_3$).

(d): a combination in which all or part of (D$_1$) in the combination (a) is substituted by (C$_1$) or (C$_3$).

(e): a combination in which all or part of (D$_1$) in the combination (a) is substituted by (E$_1$) or (E$_5$).

Examples of a more preferable combination encompass (i) a repeating structural unit, in an amount of 10 mol % to 50 mol %, derived from at least one compound selected from the group consisting of p-hydroxybenzoic acid and 2-hydroxy-6-naphthoic acid, (ii) a repeating structural unit, in an amount of 10 mol % to 50 mol %, derived from at least one compound selected from the group consisting of 4-hydroxyaniline and 4,4'-diaminodiphenyl ether, (iii) a repeating structural unit, in an amount of 10 mol % to 50 mol %, derived from at least one compound selected from the group consisting of a terephthalic acid and an isophthalic acid, and (iv) a repeating structural unit, in an amount of 10 mol % to 19 mol %, derived from hydrochinone. Examples of a further preferable combination encompass (i) a repeating structural unit, in an amount of 10 mol % to 35 mol %, derived from 4-hydroxyaniline and (ii) a repeating structural unit, in an amount of 20 mol % to 45 mol %, derived from an isophthalic acid.

A method of preparing the thermoplastic resin can be a method known to a person skilled in the art, and is not limited to any particular one. A method of preparing an aromatic polyester will be described below as an example of the method for preparing the thermoplastic resin.

Examples of the method of preparing an aromatic polyester encompass a method in which (i) an aromatic hydroxycarboxylic acid, an aromatic diol, an aromatic amine having a phenolic hydroxide group, or an aromatic diamine is subjected to acylation (acylation reaction) by an excess amount of fatty acid anhydride, so that an acylated product is obtained and (ii) the acylated product thus obtained and an aromatic hydroxycarboxylic acid and/or an aromatic dicarboxylic acid are subjected to ester exchange or amide exchange so as to be polymerized.

In the acylation reaction, an amount of the fatty acid anhydride to be added is preferably 1.0 equivalent to 1.2 equivalents with respect to a total amount of the phenolic hydroxide group and the amino group combined.

The acylation reaction is to last preferably 5 minutes to 10 hours at 130° C. to 180° C., and more preferably 10 minutes to 3 hours at 140° C. to 160° C.

Examples of the fatty acid anhydride to be used for the acylation reaction encompass, but are not particularly limited to, acetic anhydride, propionic anhydride, butyric anhydride, isobutyric anhydride, and the like. Two or more of these can be mixed when used. In view of cost and workability, acetic anhydride is preferable.

During the polymerization through the ester exchange or amide exchange, an amount of the acyl group of the acylated product is preferably 0.8 equivalents to 1.2 equivalents with respect to an amount of the carboxyl group. A polymerization temperature is preferably not more than 400° C., and more preferably not more than 350° C.

Note that the acylation reaction and the polymerization through the ester exchange or amide exchange can be carried out in the presence of a catalyst. The catalyst can be a catalyst that is conventionally and publicly known as a polyester polymerization catalyst.

Polymerization through ester exchange or amide exchange is ordinarily melt polymerization. Alternatively, it is possible to carry out melt polymerization and solid phase polymerization in combination. Solid phase polymerization can be carried out by (i) extracting a polymer during a melt polymerization step, (ii) solidifying the extracted polymer, (iii) crushing the resultant polymer into a powder-like polymer or a flake-like polymer, and then (iv) subjecting the powder-like polymer or the flake-like polymer to publicly known solid phase polymerization. Specific examples of the solid phase polymerization encompass (i) a method in which the powder-like polymer or the flake-like polymer in a solid-phase state is heated in an inert atmosphere such as nitrogen at 20° C. to 350° C. for 1 hour to 30 hours, and (ii) the like. Note that an aromatic polyester obtained after the solid phase polymerization can be pelletized by a publicly known method before being used.

The thermoplastic resin contained in the porous layer in accordance with an embodiment of the present invention can be, for example, a mixture of the aforementioned aromatic polyester and the aforementioned aromatic polyamide. In the mixture of the aromatic polyester and the aromatic polyamide, a weight of the aromatic polyester is preferably not less than 20% by weight and not more than 75% by weight, and more preferably not less than 25% by weight and not more than 50% by weight with respect to the total weight of the aromatic polyester and the aromatic polyamide being 100% by weight.

Examples of the aromatic polyamide contained in the thermoplastic resin include para-aramid and meta-aramid. Among them, para-aramid is more preferable.

Examples of a method of preparing the aromatic polyamide encompass, but are not particularly limited to, condensation polymerization of para-oriented aromatic diamine and para-oriented aromatic dicarboxylic acid halide. In such a case, aromatic polyamide to be obtained substantially includes repeating units in which amide bonds are bonded at para positions or corresponding oriented positions (for example, oriented positions that extend coaxially or parallel in opposite directions such as the cases of 4,4'-biphenylene, 1,5-naphthalene, and 2,6-naphthalene) of aromatic rings. Specific examples of the aromatic polyamide encompass para-aramids each having a para-oriented structure or a structure corresponding to a para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloro-paraphenylene terephthalamide), and a paraphenylene terephthalamide/2,6-dichloroparaphenylene terephthalamide copolymer.

The aromatic polyamide can be poly(paraphenylene terephthalamide) (hereinafter referred to as "PPTA"). A solution of the PPTA can be prepared by, for example, the following specific steps (1) through (4).

(1) N-methyl-2-pyrrolidone (hereinafter also referred to as "NMP") is introduced into a flask which is dried. Then, calcium chloride, which has been dried at 200° C. for 2 hours, is added. Then, the flask is heated to 100° C. to completely dissolve the calcium chloride.

(2) A temperature of the solution obtained in the step (1) is returned to room temperature, and then paraphenylenediamine (hereinafter abbreviated as "PPD") is added. Then, the PPD is completely dissolved.

(3) While a temperature of the solution obtained in the step (2) is maintained at 20±2° C., terephthalic acid dichloride (hereinafter referred to as "TPC") is added in 10 separate portions at approximately 5-minute intervals.

(4) While a temperature of the solution obtained in the step (3) is maintained at 20±2° C., the solution is matured for 1 hour, and is then stirred under reduced pressure for 30 minutes to eliminate air bubbles, so that the solution of the PPTA is obtained.

<Filler>

The porous layer in accordance with an embodiment of the present invention preferably further includes a filler. The filler is insulating, and can be made of any material selected from an organic powder, an inorganic powder, and a mixture of an organic powder and an inorganic powder.

Examples of the organic powder encompass powders made of organic matter such as: (i) a homopolymer of a monomer such as styrene, vinyl ketone, acrylonitrile, methyl methacrylate, ethyl methacrylate, glycidyl methacrylate, glycidyl acrylate, or methyl acrylate or (ii) a copolymer of two or more of such monomers; fluorine-based resins such as polytetrafluoroethylene, an ethylene tetrafluoride-propylene hexafluoride copolymer, an ethylene tetrafluoride-ethylene copolymer, and polyvinylidene fluoride; melamine resin; urea resin; polyolefin; polymethacrylate, and the like. The filler can be made of one of these organic powders, or can be made of two or more of these organic powders mixed. Among these organic powders, a polytetrafluoroethylene powder is preferable in view of chemical stability.

Examples of the inorganic powder encompass powders made of inorganic matters such as a metal oxide, a metal nitride, a metal carbide, a metal hydroxide, a carbonate, and a sulfate. Specific examples of the inorganic powder encompass powders made of inorganic matters such as alumina, silica, titanium dioxide, aluminum hydroxide, and calcium carbonate. The filler can be made of one of these inorganic powders, or can be made of two or more of these inorganic powders mixed. Among these inorganic powders, an alumina powder is preferable in view of chemical stability. It is more preferable that particles by which the filler is constituted be all alumina particles. It is a still more preferable embodiment that (i) the particles by which the filler is constituted are all alumina particles and (ii) all or part of the alumina particles are substantially spherical alumina particles. Note that in an embodiment of the present invention, the substantially spherical alumina particles include absolutely spherical particles.

According to an embodiment of the present invention, in a case where, for example, the particles by which the filler is constituted are all alumina particles, a weight of the filler relative to a total weight of the porous layer in accordance with an embodiment of the present invention is ordinarily 20% by weight to 95% by weight, and preferably 30% by weight to 90% by weight, although a filler content of the porous layer depends also on a specific gravity of the material of the filler. The above ranges can be set as appropriate according to the specific gravity of the material of the filler.

Examples of a shape of the filler in accordance with an embodiment of the present invention encompass a substantially spherical shape, a plate-like shape, a pillar shape, a needle shape, a whisker-like shape, a fibrous shape, and the like. Although any particle can be used to constitute the filler, substantially spherical particles are preferable because substantially spherical particles allow uniform pores to be easily made. In view of a strength property and smoothness of the porous layer, an average particle diameter of particles by which the filler is constituted is preferably 0.01 µm to 1 µm. Note that the average particle diameter is to be indicated by a value measured with the use of a photograph taken by a scanning electron microscope. Specifically, any 50 particles of particles captured in the photograph are selected, respective particle diameters of the 50 particles are measured, and then an average value of the particle diameters thus measured is used as the average particle diameter.

<Physical Properties of Porous Layer>

In a case where the porous layer is disposed on both surfaces of a base material, the physical properties in the following description regarding physical properties of the porous layer refer to at least physical properties of a porous layer in contact with a cathode in the nonaqueous electrolyte secondary battery. For example, the physical properties in the following description regarding physical properties of the porous layer refer to at least physical properties of a porous layer disposed on a surface of the porous base material which surface faces a cathode of the nonaqueous electrolyte secondary battery.

In a case where a porous layer is disposed on one surface or both surfaces of the porous base material, a thickness of the porous layer is preferably 0.5 µm to 15 µm (per surface of the porous film), and more preferably 2 µm to 10 µm (per surface of the porous film), although the thickness of the porous layer can be decided as appropriate in view of a thickness of a nonaqueous electrolyte secondary battery laminated separator to be produced and a size (thickness) of a nonaqueous electrolyte secondary battery to be produced.

The thickness of the porous layer is preferably not less than 1 µm (not less than 0.5 µm per surface of the porous film). This is because, with such a thickness, (i) an internal short circuit of the battery, which internal short circuit is caused by breakage or the like of the battery, can be sufficiently prevented in a nonaqueous electrolyte secondary battery laminated separator which includes the porous layer and (ii) an amount of an electrolyte retained in the porous layer can be maintained. Meanwhile, a total thickness of both the surfaces of the porous layer is preferably not more than 30 µm (not more than 15 µm per surface of the porous film). This is because, with such a thickness, (i) it is possible to restrict an increase in resistance to permeation of ions such as lithium ions all over the nonaqueous electrolyte secondary battery laminated separator which includes the porous layers, (ii) it is possible to prevent the cathode from deteriorating in a case where a charge-discharge cycle is repeated, so that a rate characteristic and/or a cycle characteristic is/are prevented from deteriorating, and (iii) an increase in distance between the cathode and an anode is restricted, so that the nonaqueous electrolyte secondary battery can be prevented from being large in size.

The porous layer in accordance with an embodiment of the present invention has porosity of preferably 25% through 80%, and more preferably 30% through 75%. The porosity of the porous layer can be calculated from, for example, relative density and volume of the porous layer. The porosity being within the above range is preferable in view of ion permeability of a resultant porous layer and a nonaqueous electrolyte secondary battery laminated separator including the porous layer.

The porosity of the porous layer in accordance with an embodiment of the present invention can be obtained from a thickness [µm], weight per unit area [g/m$^2$], and true density [g/m$^3$] which are calculated/measured in accordance with methods below.

(Measurement of Thickness)

The thickness of the nonaqueous electrolyte secondary battery laminated separator and the thickness of the porous base material used in the nonaqueous electrolyte secondary battery laminated separator are measured with use of a high-resolution digital measuring device manufactured by Mitutoyo Corporation, in accordance with a JIS standard (K 7130-1992). The thickness of the nonaqueous electrolyte secondary battery insulating porous layer is calculated from a difference between the measured thickness of the nonaqueous electrolyte secondary battery laminated separator and the measured thickness of the porous base material.

(Weight Per Unit Area)

A sample, which has a square shape having sides of 8 cm, is cut out from a nonaqueous electrolyte secondary battery laminated separator, and a weight $W_2$ (g) of the sample is measured. A sample, which has a square shape having sides of 8 cm, is cut out from a porous base material used in the nonaqueous electrolyte secondary battery laminated separator, and a weight $W_1$ (g) of the sample is measured. A weight per unit area of the nonaqueous electrolyte secondary battery insulating porous layer is calculated in accordance with an equation (2) below.

$$\text{weight per unit area (g/m}^2\text{)}=(W_2-W_1)/(0.08\times0.08) \quad \text{Equation (2):}$$

(True Density)

A sample, which has a rectangular shape having sides of 4 mm through 6 mm is cut out from the porous layer in the nonaqueous electrolyte secondary battery laminated separator. The sample is dried in a vacuum at not more than 30° C. for 17 hours, and then a true density of the sample is measured with use of helium gas replacement using an automatic dry densimeter (AccuPye II 1340 manufactured by Micromeritics).

In accordance with an equation below, the porosity is calculated from the thickness [μm], the weight per unit area [g/m$^2$], and true density [g/m$^3$] which were obtained as above.

$$\text{porosity of porous layer[\%]}=[1-(\text{weight per unit area [g/m}^2\text{] of porous layer})/\{(\text{thickness [μm] of porous layer})\times10^{-6}\times(\text{true density [g/m}^3\text{] of porous layer})\}]\times100 \quad \text{Equation:}$$

Air permeability of the porous layer in accordance with an embodiment of the present invention is preferably 30 sec./100 cc to 300 sec./100 cc, and more preferably 50 sec./100 cc to 250 sec./100 cc, in view of ion permeability of a nonaqueous electrolyte secondary battery laminated separator including the porous layer. The air permeability being within the above range allows the porous layer to have good ion permeability, resulting in improved battery characteristics such as a resistance value of the nonaqueous electrolyte secondary battery including the porous layer.

<Porous Layer Production Method>

The porous layer in accordance with an embodiment of the present invention can be produced by, for example, (i) dissolving the thermoplastic resin in a solvent and, optionally, dispersing the filler, so as to prepare a coating solution for forming a porous layer and then (ii) coating a base material with the coating solution and then drying the coating solution, so as to deposit the porous layer in accordance with an embodiment of the present invention. Examples of the base material encompass (i) a porous base material (polyolefin porous film) described later, (ii) an electrode, and (iii) the like.

The solvent (dispersion medium) is not limited to any particular one, provided that (i) the solvent does not have an adverse effect on the base material, (ii) the solvent allows the thermoplastic resin to be uniformly and stably dissolved in the solvent, (iii) the solvent allows the filler to be uniformly and stably dispersed in the solvent. Specific examples of the solvent (dispersion medium) encompass N-methylpyrrolidone, N,N-dimethylacetamide, N,N dimethylformamide, and the like. Only one of these solvents (dispersion media) can be used, or two or more of these solvents (dispersion media) can be used in combination.

The coating solution can be formed by any method, provided that the coating solution can satisfy conditions such as a resin solid content (resin concentration) and an amount of the filler, each of which conditions is necessary to obtain a desired porous layer. Specific examples of the method encompass a method in which a filler is added to and dispersed in a solution which is obtained by dissolving the thermoplastic resin in a solvent (dispersion medium). In a case where the filler is added, the filler can be dispersed in a solvent (dispersion medium) with the use of a conventionally and publicly known dispersing device, examples of which encompass a three-one motor, a homogenizer, a medium type dispersing device, a pressure type dispersing device, and the like.

A method of coating the base material with the coating solution encompass publicly known coating methods such as a knife coater method, a blade coater method, a bar coater method, a gravure coater method, and a die coater method.

A method of removing the solvent (dispersion medium) is generally a drying method. Examples of the drying method encompass natural drying, air-blowing drying, heat drying, drying under reduced pressure, and the like. Note, however, any method can be used, provided that the solvent (dispersion medium) can be sufficiently removed. In addition, drying can be carried out after the solvent (dispersion medium) contained in the coating solution is replaced with another solvent. Specific examples of the method, in which the solvent (dispersion medium) is replaced with another solvent and then drying is carried out, encompass a method in which (i) the solvent (dispersion medium) is replaced with a poor solvent having a low boiling point, such as water, alcohol, or acetone, (ii) the porous layer is deposited, and then (iii) the drying is carried out.

Examples of the method of controlling the displacement ratio of the porous layer in accordance with an embodiment of the present invention to be in a range of not less than 100% and less than 115% include, but are not particularly limited to, (i) a method of appropriately adjusting a production condition of the porous layer, and (ii) a method of mixing two or more types of resins with different properties as thermoplastic resins to be contained in the porous layer.

Examples of the appropriate production condition include a resin density of the coating solution being in a range of not less than 4% by weight and less than 20% by weight. A more preferable range of the resin density is not less than 5% by weight and not more than 15% by weight. In a case where the resin density is smaller than the above range, a resin deposition speed in the step of removing a solvent is small, so that a deposited resin becomes large and the structure of whole layers becomes uneven. This results in a tendency that plastic deformation is more likely to occur. On the other hand, in a case where the resin density is larger than the above range, the coating solution is not dispersed sufficiently and the structure of whole layers becomes uneven. This results in a tendency that plastic deformation is more likely to occur.

There is a tendency that use of two or more types of resins with different properties in mixture for a porous layer can subdue compatibility and deformability of the resins constituting the porous layer, as compared to use of a single resin. This results in a tendency that the degree of plastic deformation of the porous layer becomes small.

Furthermore, by using (i) a resin made of rigid para-oriented monomer only and (ii) a thermoplastic resin which uses an appropriate amount of meta-oriented monomer as a monomer in combination as thermoplastic resins contained in the porous layer, it is possible to provide the porous layer with an appropriate flexibility while maintaining rigidity of the porous layer. This makes plastic deformation of the resulting porous layer less likely to occur, thereby controlling the displacement ratio to be within the range of not less than 100% and less than 115%.

Embodiment 2: Nonaqueous Electrolyte Secondary Battery Laminated Separator

A nonaqueous electrolyte secondary battery laminated separator in accordance with Embodiment 2 of the present invention includes (i) a polyolefin porous film and (ii) the porous layer in accordance with Embodiment 1 of the present invention. Preferably, the nonaqueous electrolyte secondary battery laminated separator in accordance with Embodiment 2 of the present invention includes (i) a polyolefin porous film and (ii) a porous layer in accordance with Embodiment 1 of the present invention which porous layer is disposed on at least one surface of the polyolefin porous film.

Since a nonaqueous electrolyte secondary battery laminated separator in accordance with an embodiment of the present invention includes a nonaqueous electrolyte secondary battery insulating porous layer in accordance with an embodiment of the present invention, a cycle characteristic of a nonaqueous electrolyte secondary battery is enhanced.

<Polyolefin Porous Film>

A polyolefin porous film used in an embodiment of the present invention is a porous film containing a polyolefin-based resin as a main component. The porous film is preferably a microporous film. Specifically, the porous film, which contains a polyolefin-based resin as a main component, has pores therein, the pores being connected to one another, so that a gas and a liquid can pass through the porous film from one surface of the porous film to the other. The porous film can include a single layer or a plurality of layers.

The "porous film containing a polyolefin-based resin as a main component" herein means that a polyolefin-based resin component is contained in the porous film at a proportion of ordinarily not less than 50% by volume, preferably not less than 90% by volume, and more preferably not less than 95% by volume of an entire portion of a material of the porous film. The polyolefin-based resin contained in the polyolefin porous film preferably contains a high molecular weight component having a weight-average molecular weight of $5 \times 10^5$ to $15 \times 10^6$. It is preferable that a polyolefin-based resin having a weight-average molecular weight of not less than 1,000,000 be contained as a polyolefin-based resin in the porous film. This is because, in such a case, there can be an increase in (i) strength of an entire portion of the polyolefin porous film and (ii) strength of an entire portion of a nonaqueous electrolyte secondary battery laminated separator which includes the polyolefin porous film and the porous layer.

Examples of the polyolefin-based resin encompass high molecular weight homopolymers (such as polyethylene, polypropylene, and polybutene) and high molecular weight copolymers (such as ethylene-propylene copolymer) produced through polymerization of ethylene, propylene, 1-butene, 4-methyl-1-pentene, or 1-hexene. The polyolefin porous film is a layer which includes one of these polyolefin-based resins and/or two or more of these polyolefin-based resins. A high molecular weight polyethylene-based resin containing ethylene as a main component is particularly preferable in view of the fact that such a polyethylene-based resin can prevent (shutdown) the flow of an excessively large current at a low temperature. Note that the polyolefin porous film can contain any component other than the polyolefin-based resin, provided that the component does not impair the function of the polyolefin porous film.

Air permeability of the porous film in terms of Gurley values is ordinarily 30 sec/100 cc to 500 sec/100 cc, and preferably 50 sec/100 cc to 300 sec/100 cc. If the air permeability of the porous film falls within these ranges, sufficient ion permeability can be imparted to (i) a nonaqueous electrolyte secondary battery separator in a case where the porous film is used as the nonaqueous electrolyte secondary battery separator or (ii) a nonaqueous electrolyte secondary battery laminated separator in a case where the porous film is used as a member of the nonaqueous electrolyte secondary battery laminated separator including a porous layer described later.

In regard to a thickness of the porous film, a less thickness can cause energy density of the battery to be higher. Therefore, the thickness of the porous film is preferably not more than 20 µm, more preferably not more than 16 µm, and still more preferably not more than 11 µm. In view of film strength, the thickness of the porous film is preferably not less than 4 µm. That is, the thickness of the porous film is preferably 4 µm to 20 µm.

A method of producing the porous film can be any publicly known method, and is not limited to any particular one. For example, as disclosed in Japanese Patent No. 5476844, the porous film can be produced by (i) adding a filler to a thermoplastic resin, (ii) forming, into a film, the thermoplastic resin containing the filler, and then (iii) removing the filler.

Specifically, in a case where, for example, the porous film is made of polyolefin resin containing ultra-high molecular weight polyethylene and low molecular weight polyolefin which has a weight-average molecular weight of not more than 10,000, the porous film is preferably produced by, in view of production costs, a method including the following steps (1) through (4):

(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of an inorganic filler such as calcium carbonate, so that a polyolefin resin composition is obtained;

(2) forming the polyolefin resin composition into a sheet;

(3) removing the inorganic filler from the sheet obtained in the step (2); and (4) stretching the sheet obtained in the step (3). Alternatively, the porous film can be produced through a method disclosed in the above-described Patent Literature.

Alternatively, the porous film of the present invention can be a commercial product having the above-described characteristics.

<Nonaqueous Electrolyte Secondary Battery Laminated Separator Production Method>

The nonaqueous electrolyte secondary battery laminated separator in accordance with an embodiment of the present invention can be produced by the same method as the aforementioned method for producing the porous layer in accordance with an embodiment of the present invention, specifically, by a method in which the polyolefin porous film is used as the base material.

<Physical Properties of Nonaqueous Electrolyte Secondary Battery Laminated Separator>

In regard to a thickness of the nonaqueous electrolyte secondary battery laminated separator in accordance with an embodiment of the present invention, a less thickness can allow energy density of the battery to be higher, and is therefore preferable. However, a less thickness also leads to less strength, and there is therefore a limitation on a reduction in the thickness during production of the nonaqueous electrolyte secondary battery laminated separator. In view of these factors, the nonaqueous electrolyte secondary battery laminated separator in accordance with an embodiment of the present invention has a thickness of preferably not more than 50 μm, more preferably not more than 25 μm, and still more preferably not more than 20 μm. In addition, the nonaqueous electrolyte secondary battery laminated separator preferably has a thickness of not less than 5 μm.

Air permeability of the nonaqueous electrolyte secondary battery laminated separator in accordance with an embodiment of the present invention in terms of Gurley values is preferably 30 sec/100 cc to 1000 sec/100 cc, and more preferably 50 sec/100 cc to 800 sec/100 cc. In a case where the nonaqueous electrolyte secondary battery laminated separator has air permeability falling within these ranges, the nonaqueous electrolyte secondary battery laminated separator can have sufficient ion permeability. If the air permeability is above these ranges, then it means that the nonaqueous electrolyte secondary battery laminated separator has a high porosity and that a laminated structure is therefore rough. This poses a risk that strength of the nonaqueous electrolyte secondary battery laminated separator may decrease, so that shape stability particularly at a high temperature may be insufficient. Meanwhile, if the air permeability is below these ranges, then the nonaqueous electrolyte secondary battery laminated separator may not have a sufficient ion permeability. This may cause deterioration of the battery characteristic of the nonaqueous electrolyte secondary battery.

Note that the nonaqueous electrolyte secondary battery laminated separator in accordance with an embodiment of the present invention can include, as needed, a publicly known porous film(s) such as an adhesive layer and/or a protection layer in addition to the porous film and the porous layer, provided that the objective of an embodiment of the present invention is not impaired.

Embodiment 3: Nonaqueous Electrolyte Secondary Battery Member, Embodiment 4: Nonaqueous Electrolyte Secondary Battery A nonaqueous electrolyte secondary battery member in accordance with Embodiment 3 of the present invention is obtained by arranging a cathode, the nonaqueous electrolyte secondary battery insulating porous layer in accordance with Embodiment 1 of the present invention or the nonaqueous electrolyte secondary battery laminated separator in accordance with Embodiment 2 of the present invention, and an anode, the cathode, the nonaqueous electrolyte secondary battery insulating porous layer or the nonaqueous electrolyte secondary battery laminated separator, and the anode being arranged in this order.

A nonaqueous electrolyte secondary battery in accordance with Embodiment 4 of the present invention includes (i) the nonaqueous electrolyte secondary battery insulating porous layer in accordance with Embodiment 1 of the present invention or (ii) the nonaqueous electrolyte secondary battery laminated separator in accordance with Embodiment 2 of the present invention.

A nonaqueous electrolyte secondary battery in accordance with an embodiment of the present invention can be, for example, a nonaqueous secondary battery that achieves an electromotive force through doping and dedoping with lithium, and can include a nonaqueous electrolyte secondary battery member including a cathode, a nonaqueous electrolyte secondary battery insulating porous layer in accordance with an embodiment of the present invention, and an anode, the cathode, the nonaqueous electrolyte secondary battery insulating porous layer, and the anode being disposed in this order. Alternatively, the nonaqueous electrolyte secondary battery in accordance with an embodiment of the present invention can be, for example, a nonaqueous secondary battery that achieves an electromotive force through doping and dedoping with lithium, and can be a lithium ion secondary battery that includes a nonaqueous electrolyte secondary battery member including a cathode, a nonaqueous electrolyte secondary battery insulating porous layer in accordance with an embodiment of the present invention, a polyolefin porous film, and an anode which are disposed in this order, that is, a lithium ion secondary battery that includes a nonaqueous electrolyte secondary battery member including a cathode, a nonaqueous electrolyte secondary battery laminated separator in accordance with an embodiment of the present invention, and an anode which are disposed in this order. Note that constituent elements, other than the nonaqueous electrolyte secondary battery separator, of the nonaqueous electrolyte secondary battery are not limited to those described below.

The nonaqueous electrolyte secondary battery in accordance with an embodiment of the present invention is ordinarily configured so that a battery element is enclosed in an exterior member, the battery element including (i) a structure in which the anode and the cathode faces each other via the porous layer in accordance with an embodiment of the present invention or the nonaqueous electrolyte secondary battery laminated separator in accordance with an embodiment of the present invention and (ii) an electrolyte with which the structure is impregnated. The nonaqueous electrolyte secondary battery is preferably a secondary battery including a nonaqueous electrolyte, and is particularly preferably a lithium ion secondary battery. Note that the doping means occlusion, support, adsorption, or insertion, and means a phenomenon in which lithium ions enter an active material of an electrode (e.g., a cathode).

Since the nonaqueous electrolyte secondary battery member in accordance with an embodiment of the present invention includes the nonaqueous electrolyte secondary battery insulating porous layer in accordance with an embodiment of the present invention or includes the nonaqueous electrolyte secondary battery laminated separator in accordance with an embodiment of the present invention, a cycle characteristic of a nonaqueous electrolyte secondary battery can be enhanced. Since the nonaqueous electrolyte secondary battery in accordance with an embodiment of the present invention includes the nonaqueous electrolyte secondary battery insulating porous layer in accordance with an embodiment of the present invention or includes the nonaqueous electrolyte secondary battery laminated separator in accordance with an embodiment of the present invention, a cycle characteristic of the nonaqueous electrolyte secondary battery can be enhanced <Cathode>

A cathode included in the nonaqueous electrolyte secondary battery member in accordance with an embodiment of the present invention or included in the nonaqueous electrolyte secondary battery in accordance with an embodiment of the present invention is not limited to any particular one, provided that the cathode is one that is typically used as a cathode of a nonaqueous electrolyte secondary battery. Examples of the cathode encompass a cathode sheet having a structure in which an active material layer containing a cathode active material and a binder resin is formed on a current collector. The active material layer can further contain an electrically conductive agent and a binding agent.

The cathode active material is, for example, a material capable of being doped with and dedoped of lithium ions. Specific examples of such a material encompass a lithium complex oxide containing at least one transition metal such as V, Mn, Fe, Co, or Ni.

Examples of the electrically conductive agent encompass carbonaceous materials such as natural graphite, artificial graphite, cokes, carbon black, pyrolytic carbons, carbon fiber, a fired product of an organic polymer compound, and the like. It is possible to use (i) only one kind of the above electrically conductive agents or (ii) two or more kinds of the above electrically conductive agents in combination.

Examples of the binding agent encompass (i) fluorine-based resins such as polyvinylidene fluoride, (ii) acrylic resin, and (iii) styrene butadiene rubber. Note that the binding agent serves also as a thickener.

Examples of the cathode current collector encompass electric conductors such as Al, Ni, and stainless steel. Among these, Al is preferable because Al is easily processed into a thin film and is inexpensive.

Examples of a method of producing the cathode sheet encompass: (I) a method in which a cathode active material, an electrically conductive agent, and a binding agent are pressure-molded on a cathode current collector; (II) a method in which (i) a cathode active material, an electrically conductive agent, and a binding agent are formed into a paste with the use of a suitable organic solvent, (ii) a cathode current collector is coated with the paste, and then (iii) the paste is dried and then pressured so that the paste is firmly fixed to the cathode current collector; and (III) the like.

<Anode>

An anode included in the nonaqueous electrolyte secondary battery member in accordance with an embodiment of the present invention or included in the nonaqueous electrolyte secondary battery in accordance with an embodiment of the present invention is not limited to any particular one, provided that the anode is a one that is typically used as an anode of a nonaqueous electrolyte secondary battery. Examples of the anode encompass an anode sheet having a structure in which an active material layer containing an anode active material and a binder resin is formed on a current collector. The active material layer can further contain an electrically conductive auxiliary agent and a binding agent.

Examples of the anode active material encompass (i) a material capable of being doped with and dedoped of lithium ions, (ii) lithium metal, and (iii) lithium alloy. Examples of such a material encompass carbonaceous materials such as natural graphite, artificial graphite, cokes, carbon black, and pyrolytic carbon.

The anode current collector is exemplified by Cu, Ni, stainless steel, and the like, among which Cu is more preferable because Cu is not easily alloyed with lithium especially in the case of a lithium ion secondary battery and is easily processed into a thin film.

Examples of a method of producing the anode sheet encompass: a method in which an anode active material is pressure-molded on an anode current collector; and a method in which (i) an anode active material is formed into a paste with the use of a suitable organic solvent, (ii) an anode current collector is coated with the paste, and then (iii) the paste is dried and then pressured so that the paste is firmly fixed to the anode current collector. The paste preferably contains the electrically conductive auxiliary agent and the binding agent.

<Nonaqueous electrolyte> A nonaqueous electrolyte in a nonaqueous electrolyte secondary battery in accordance with an embodiment of the present invention is not limited to any particular one, provided that the nonaqueous electrolyte is one that is typically used for a nonaqueous electrolyte secondary battery. The nonaqueous electrolyte can be one prepared by dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, $LiAlCl_4$, and the like. It is possible to use (i) only one kind of the above lithium salts or (ii) two or more kinds of the above lithium salts in combination.

Examples of the organic solvent to be contained in the nonaqueous electrolyte encompass carbonates, ethers, esters, nitriles, amides, carbamates, a sulfur-containing compound, a fluorine-containing organic solvent obtained by introducing a fluorine group into any of these organic solvents, and the like. It is possible to use (i) only one kind of the above organic solvents or (ii) two or more kinds of the above organic solvents in combination.

<Nonaqueous Electrolyte Secondary Battery Member Production Method and Nonaqueous Electrolyte Secondary Battery Production Method>

An nonaqueous electrolyte secondary battery member in accordance with an embodiment of the present invention can be produced by, for example, arranging a cathode, a nonaqueous electrolyte secondary battery insulating porous layer and a porous base material each in accordance with an embodiment of the present invention or a nonaqueous electrolyte secondary battery laminated separator in accordance with an embodiment of the present invention, and an anode in this order.

A nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container under reduced pressure.

EXAMPLES

[Measuring Method]

Physical property values of polyolefin porous films, nonaqueous electrolyte secondary battery insulating porous layers, and nonaqueous electrolyte secondary battery laminated separators in accordance with Examples 1 through 4 and Comparative Examples 1 through 4 were measured as follows.

<Measurement of Thickness>

In Examples 1 through 4 and Comparative Examples 1 through 4, thicknesses of the nonaqueous electrolyte secondary battery laminated separators and the polyolefin porous films were measured in conformity with a JIS standard (K 7130-1992) with the use of a high-resolution digital measuring device manufactured by Mitutoyo Corporation. Furthermore, thicknesses of nonaqueous electrolyte secondary battery insulating porous layers were calculated from differences between the thicknesses of the nonaqueous electrolyte secondary battery laminated separators and the thicknesses of the polyolefin porous films.

<Measurement of Porosity>

<Weight Per Unit Area>

From the polyolefin porous film, a square piece of 8 cm×8 cm was cut out as a sample, and a weight $W_1$ (g) of the sample was measured. From the nonaqueous electrolyte secondary battery laminated separator, a square piece of 8 cm×8 cm was cut out as a sample, and a weight $W_2$ (g) of the sample was measured. Then, according to the following Formula (1), a weight per unit area of the nonaqueous electrolyte secondary battery insulating porous layer was calculated.

$$\text{Weight per unit area (g/m}^2) = (W_2 - W_1)/(0.08 \times 0.08) \quad (1)$$

In accordance with an equation (2) below, the porosity [%] of the porous layer was calculated from the thickness [μm] of the porous layer, the weight per unit area [g/m$^2$] of the porous layer, and true density [g/m$^3$] of the porous layer, which were calculated and measured as above.

$$(\text{Porosity}) = [1 - (\text{weight per unit area})/\{(\text{thickness}) \times 10^{-6} \times 1[\text{m}^2] \times (\text{true density})\}] \times 100 \quad (2)$$

<Measurement of "Displacement Amount at Loading-Unloading Cycle" and "Displacement Ratio">

As illustrated in FIG. 1, a measurement sample 2 was obtained by cutting out a square having a side of 1 cm from a porous layer. The measurement sample 2 was fixed onto a sample table with use of an adhesive (liquid glue), and a planar presser 1 (made of a diamond) of 50 μm in diameter was pushed at a speed of 0.4877 mN/sec. into the measurement sample 2 to reach a depth corresponding to a load of 1 mN from a surface of the measurement sample 2 (loading). Immediately thereafter, without providing a hold time, the planar presser 1 was pulled back, at a speed of 0.4877 mN/sec., to the surface of the measurement sample 2 where the load is 0 mN (unloading). Here, "load" indicates a stress which the planar presser 1 receives from the measurement sample 2 when the planar presser 1 is pushed into the measurement sample 2.

A cycle of applying a load to the measurement sample 2 and immediately thereafter removing the load (herein referred to as "loading-unloading cycle") was repeated 50 times. At the tenth loading-unloading cycle of the measurement sample 2, a distance between (i) a depth by which the planar presser 1 was pushed into the measurement sample 2 and (ii) a location on the surface of the measurement sample 2 at which location a load was 0 mN when the planar presser 1 was pulled back was measured. This distance was regarded as a displacement amount (unit: μm) in the tenth loading-unloading cycle. Similarly, at the fiftieth loading-unloading cycle of the measurement sample 2, a distance between (i) a depth by which the planar presser 1 was pushed into the measurement sample 2 and (ii) a location on the surface of the measurement sample 2 at which location a load was 0 mN when the planar presser 1 was pulled back was measured. This distance was regarded as a displacement amount (unit: μm) in the fiftieth loading-unloading cycle.

Here, "surface" indicates a location where a load was 0 mN at the end of the unloading in the previous loading-unloading cycle.

The displacement ratio {(displacement amount at tenth loading-unloading cycle)/(displacement amount at fiftieth loading-unloading cycle)} was calculated from (i) a displacement amount at the tenth loading-unloading cycle measured as above and (ii) a displacement amount at the fiftieth loading-unloading cycle measured as above.

[Cycle Characteristic: Capacity Maintenance Ratio]

Capacity maintenance ratios, after 100 cycles, of the nonaqueous electrolyte secondary batteries produced in Examples 1 through 4 and Comparative Examples 1 through 4 were measured in accordance with a method below, and thus cycle characteristics of the nonaqueous electrolyte secondary batteries were evaluated.

The nonaqueous electrolyte secondary batteries which had been produced in Examples 1 through 4 and Comparative Examples 1 through 4 and which had not yet been subjected to a charging-discharging cycle were subjected to four cycles of initial charging and discharging. In each cycle, charging and discharging were performed under conditions that a temperature was 25° C., a voltage was in a range of 2.7 through 4.1 V, and a current value was 0.2 C (Note that 1 C is defined as a value of an electric current at which a rated capacity based on a discharge capacity at 1 hour rate is discharged for 1 hour. The same applies to the following description).

Capacities of the nonaqueous electrolyte secondary batteries having been subjected to initial charging and discharging (initial capacities) were measured.

Then, the nonaqueous electrolyte secondary batteries whose initial capacities had been measured were subjected to charging and discharging for 100 cycles. In each cycle, charging and discharging were performed under conditions that a temperature was 55° C., a charging current value was 1 C, and a discharging current value was 10 C. Capacities of the nonaqueous electrolyte secondary batteries having been subjected to charging and discharging for 100 cycles (capacities after 100 cycles) were measured.

Ratios of the capacities after 100 cycles to the initial capacities measured as above were calculated and regarded as capacity maintenance ratios after 100 cycles.

Example 1

<Synthesis of Thermal Plastic Resin>
(Synthesis of Wholly Aromatic Polyester)

A wholly aromatic polyester A was synthesized as a thermoplastic resin by a method shown below.

Into a reactor including a stirring apparatus, a torque meter, a nitrogen gas inlet tube, a thermometer, and a reflux condenser, 248.6 g (1.8 mol) of 4-hydroxybenzoic acid, 468.6 g (3.1 mol) of 4-hydroxyacetanilide, 681.1 g (4.1 mol) of isophthalic acid, and 110.1 g (1.0 mol) of hydrochinone were introduced. Then, a gas inside the reactor was sufficiently replaced with a nitrogen gas, and then a temperature inside the reactor was increased to 150° C. under a nitrogen gas airflow over a period of 15 minutes. Then, while the temperature (150° C.) was maintained, a reaction solution was refluxed for 3 hours.

Then, while an acetic acid distilled as a byproduct and an unreacted acetic anhydride were distilled away, the temperature was increased to 300° C. over a period of 300 minutes. At a time point at which an increase in torque was observed, it was determined that a reaction had ended. Then, a resultant content was extracted. The resultant content was cooled to room temperature, and then was crushed with the use of a crusher. Then, a wholly aromatic polyester powder having a relatively low molecular weight was obtained.

Furthermore, the wholly aromatic polyester powder was subjected to a heating treatment under a nitrogen atmosphere at 290° C. for 3 hours, so that solid-phase polymerization was carried out.

The wholly aromatic polyester having a relatively high molecular weight thus obtained is referred to as an aromatic polyester B. 100 g of the aromatic polyester B was added to a medium of 400 g of N-methyl-2-pyrrolidone (hereinafter referred to as NMP), and the resultant was heated at 100° C. for 2 hours to obtain a solution of the aromatic polyester B.

(Synthesis of Aramid Resin)

The aramid resin A was synthesized as a thermoplastic resin according to a method below with the use of a 5-liter separable flask having a stirring blade, a thermometer, a nitrogen incurrent canal, and a powder addition port.

The separable flask was sufficiently dried, and then 4200 g of NMP was introduced into the separable flask. Then, 272.65 g of calcium chloride, which had been dried at 200° C. for 2 hours, was added, and then a temperature inside the separable flask was increased to 100° C. After the calcium chloride was completely dissolved, the temperature inside the flask was returned to room temperature, and then 132.91 g of paraphenylenediamine (hereinafter abbreviated as "PPD") was added. Then, the PPD was completely dissolved, so that a solution was obtained. While a temperature of the solution was maintained at 20±2° C., 243.32 g of a terephthalic acid dichloride (hereinafter abbreviated as "TPC") was added, to the solution, in ten separate portions at approximately 5-minute intervals. Then, while a temperature of the resultant solution was maintained at 20±2° C., the solution was matured for 1 hour. Then, the solution was stirred under reduced pressure for 30 minutes to eliminate air bubbles, so that a solution of the aramid resin A (polymer solution) was obtained.

<Preparation of Coating Solution>

The solution of the aromatic polyester B and the solution of the aramid resin A were mixed to form a mixed solution so that a mixing ratio, (aromatic polyester B):(aramid resin A), would be 50 parts by weight: 150 parts by weight. Then, 200 parts by weight of an alumina powder having an average particle size of 0.02 μm and 200 parts by weight of an alumina powder having an average particle size of 0.3 μm were added to 100 parts by weight of the aromatic polyester B. Then, a resultant mixture was diluted with NMP so that a solid content concentration would be 7.0%. Then, the resultant mixture was stirred with the use of a homogenizer, and was then treated twice at 50 MPa with the use of a pressure type dispersing device, so that a coating solution 1 was obtained.

<Production of Nonaqueous Electrolyte Secondary Battery Laminated Separator>

The coating solution 1 thus obtained was applied by the doctor blade method onto a polyethylene porous film (of 12 μm in thickness and 44% in porosity) which was a polyolefin porous film so that the coating solution contained a solid content of 2.6 g per 1 m². A laminate which was the resultant coated product was placed, for 1 minute, in a humidifying oven having a relative humidity of 80% at 60° C., was then washed with the use of ion exchange water, and was then dried with the use of an oven at 80° C., so that a nonaqueous electrolyte secondary battery laminated separator was obtained. The nonaqueous electrolyte secondary battery laminated separator thus obtained will be referred to as a nonaqueous electrolyte secondary battery laminated separator 1. A thickness of the nonaqueous electrolyte secondary battery laminated separator 1 was 15.8 μm and porosity of the porous layer was 68%.

<Production of Nonaqueous Electrolyte Secondary Battery>

Next, with the use of the nonaqueous electrolyte secondary battery laminated separator 1 produced as described above, a nonaqueous electrolyte secondary battery was produced as follows.

(Preparation of Cathode)

A commercially available cathode which was produced by applying LiNi$_{0.5}$Mn$_{0.3}$Co$_{0.2}$O$_2$/conductive material/PVDF (weight ratio 92/5/3) to an aluminum foil was used. The aluminum foil of the commercially available cathode was cut so that a portion of the cathode where a cathode active material layer was formed had a size of 45 mm×30 mm and a portion where the cathode active material layer was not formed, with a width of 13 mm, remained around that portion. The cathode active material layer had a thickness of 58 μm and density of 2.50 g/cm³. The cathode had a capacity of 174 mAh/g.

(Preparation of anode) A commercially available anode produced by applying graphite/styrene-1,3-butadiene copolymer/carboxymethyl cellulose sodium (weight ratio 98/1/1) to a copper foil was used. The copper foil of the commercially available anode was cut so that a portion of the anode where an anode active material layer was formed had a size of 50 mm×35 mm, and a portion where the anode active material layer was not formed, with a width of 13 mm, remained around that portion. The anode active material layer had a thickness of 49 μm and density of 1.40 g/cm³. The anode had a capacity of 372 mAh/g.

(Assembling of Nonaqueous Electrolyte Secondary Battery)

With the use of the cathode, the anode, and the nonaqueous electrolyte secondary battery laminated separator 1, a nonaqueous electrolyte secondary battery was produced by the following method.

In a laminate pouch, the cathode, the nonaqueous electrolyte secondary battery laminated separator 1, and the anode were disposed (provided) in this order so as to obtain a nonaqueous electrolyte secondary battery member. In this case, the cathode and the anode were positioned so that a whole of a main surface of the cathode active material layer of the cathode was included in a range of a main surface (overlapped the main surface) of the anode active material layer of the anode.

Subsequently, the nonaqueous electrolyte secondary battery member was put in a bag made by disposing an aluminum layer and a heat seal layer, and 0.25 mL of a nonaqueous electrolyte solution was poured into the bag. The nonaqueous electrolyte solution was an electrolyte solution at 25° C. obtained by dissolving LiPF$_6$ with a concentration of 1.0 mole per liter in a mixed solvent of ethyl methyl carbonate, diethyl carbonate, and ethylene carbonate in a volume ratio of 50:20:30. The bag was heat-sealed while a pressure inside the bag was reduced, so that a nonaqueous electrolyte secondary battery was produced. The nonaqueous electrolyte secondary battery had a design capacity of 20.5 mAh. The nonaqueous electrolyte secondary battery thus produced will be referred to as a nonaqueous electrolyte secondary battery 1.

Example 2

<Production of Nonaqueous Electrolyte Secondary Battery Laminated Separator>

A coating solution 2 was obtained in a manner similar to that of Example 1 except that a solution of the aromatic polyester B and a solution of the aramid resin A were mixed so that the aramid resin A was in an amount of 128 parts by weight with respect to 72 parts by weight of the aromatic polyester B, the resultant solution was mixed with alumina powder to obtain a dispersion solution, and the dispersion solution was diluted with NMP so as to have a solid concentration of 8.0%. With use of the resultant coating solution 2, a nonaqueous electrolyte secondary battery laminated separator was obtained by a method similar to that of Example 1. The resultant nonaqueous electrolyte secondary battery laminated separator will be referred to as a nonaqueous electrolyte secondary battery laminated separator 2. A thickness of the nonaqueous electrolyte secondary battery laminated separator 2 was 15.9 μm and porosity of the porous layer was 67%.

<Production of Nonaqueous Electrolyte Secondary Battery>

A nonaqueous electrolyte secondary battery was produced by a method similar to the method described in Example 1 except that the nonaqueous electrolyte secondary battery laminated separator 2 was used instead of the nonaqueous electrolyte secondary battery laminated separator 1. The nonaqueous electrolyte secondary battery will be referred to as a nonaqueous electrolyte secondary battery 2.

Example 3

<Production of Nonaqueous Electrolyte Secondary Battery Laminated Separator>

A coating solution 3 was obtained in a manner similar to that of Example 1 except that a solution of the aromatic polyester B and a solution of the aramid resin A were mixed so that the aramid resin A was in an amount of 100 parts by weight with respect to 100 parts by weight of the aromatic polyester B, the resultant solution was mixed with alumina powder to obtain a dispersion solution, and the dispersion solution was diluted with NMP so as to have a solid concentration of 9.0%. With use of the resultant coating solution 3, a nonaqueous electrolyte secondary battery laminated separator was obtained in a manner similar to that of Example 1. The resultant nonaqueous electrolyte secondary battery laminated separator will be referred to as a nonaqueous electrolyte secondary battery laminated separator 3. A thickness of the nonaqueous electrolyte secondary battery laminated separator 3 was 16.0 μm and porosity of the porous layer was 68%.

<Production of Nonaqueous Electrolyte Secondary Battery>

A nonaqueous electrolyte secondary battery was produced by a method similar to the method described in Example 1 except that the nonaqueous electrolyte secondary battery laminated separator 3 was used instead of the nonaqueous electrolyte secondary battery laminated separator 1. The nonaqueous electrolyte secondary battery will be referred to as a nonaqueous electrolyte secondary battery 3.

Example 4

<Production of Nonaqueous Electrolyte Secondary Battery Laminated Separator>

A coating solution 4 was obtained in a manner similar to that of Example 1 except that a solution of the aromatic polyester B and a solution of the aramid resin A were mixed so that the aramid resin A was in an amount of 80 parts by weight with respect to 120 parts by weight of the aromatic polyester B, the resultant solution was mixed with alumina powder to obtain a dispersion solution, and the dispersion solution was diluted with NMP so as to have a solid concentration of 10.0%. With use of the resultant coating solution 4, a nonaqueous electrolyte secondary battery laminated separator was obtained in a manner similar to that of Example 1. The resultant nonaqueous electrolyte secondary battery laminated separator will be referred to as a nonaqueous electrolyte secondary battery laminated separator 4. A thickness of the nonaqueous electrolyte secondary battery laminated separator 4 was 15.8 μm and porosity of the porous layer was 68%.

<Production of Nonaqueous Electrolyte Secondary Battery>

A nonaqueous electrolyte secondary battery was produced by a method similar to the method described in Example 1 except that the nonaqueous electrolyte secondary battery laminated separator 4 was used instead of the nonaqueous electrolyte secondary battery laminated separator 1. The nonaqueous electrolyte secondary battery will be referred to as a nonaqueous electrolyte secondary battery 4.

Comparative Example 1

<Production of Nonaqueous Electrolyte Secondary Battery Laminated Separator>

A solvent (NMP) was added to only the aromatic polyester B without using the aramid resin A, and the resultant was adjusted so as to have a solid concentration (aromatic polyester B) of 20% by weight. 200 parts by weight of alumina powder with an average particle size of 0.02 μm and 200 parts by weight of alumina powder with an average particle size of 0.3 μm were added to 200 parts by weight of the polymer B to obtain a dispersion solution. The dispersion solution was diffused, mixed, and dispersed in a method similar to that of Example 1 to obtain a coating solution 5. With use of the resultant coating solution 5, a nonaqueous electrolyte secondary battery laminated separator was obtained in a method similar to that of Example 1. The resultant nonaqueous electrolyte secondary battery laminated separator will be referred to as a nonaqueous electrolyte secondary battery laminated separator 5. A thickness of the nonaqueous electrolyte secondary battery laminated separator 5 was 15.8 μm and porosity of the porous layer was 68%.

<Production of Nonaqueous Electrolyte Secondary Battery>

A nonaqueous electrolyte secondary battery was produced by a method similar to the method described in Example 1 except that the nonaqueous electrolyte secondary battery laminated separator 5 was used instead of the nonaqueous electrolyte secondary battery laminated separator 1. The nonaqueous electrolyte secondary battery will be referred to as a nonaqueous electrolyte secondary battery 5.

Comparative Example 2

<Synthesis of Aramid Resin>

Into a 5-liter separable flask having a stirring blade, a thermometer, a nitrogen incurrent canal, and a powder addition port, 222 g of methaphenylendiamine and 3300 g of NMP were introduced, and the resultant was stirred and dissolved. Then, 419 g of chloride isophthalate heated at 70° C. and dissolved was dissolved in 1000 g of NMP, and the resultant was dropped into the separable flask. The resultant in the separable flask was reacted at 23° C. for 60 minutes to obtain a 10% aramid resin solution. The resultant aramid resin solution was dried under a reduced pressure to obtain a solid of an aramid resin C.

<Production of Nonaqueous Electrolyte Secondary Battery Laminated Separator>

A solution was prepared by mixing the solid of the aramid resin C, alumina fine particles (product name "AKP 3000", manufactured by Sumitomo Chemical Co., Ltd.), and a solvent (mixed solvent obtained by mixing 60 parts by weight of dimethylacetamide with 40 parts by weight of tripropylene glycol) so that the aramid resin was in an amount of 30 parts by weight with respect to 70 parts by weight of the alumina fine particles. Then, the solvent was added to the resultant mixture solution so that the resultant had a solid concentration (alumina fine particles and aramid resin) of 20% by weight, and thus a dispersion solution was obtained. Then, a coating solution 6 was obtained in a method similar to that of Example 1 except that the dispersion solution obtained as above was used.

The coating solution 6 thus obtained was applied by the doctor blade method onto a polyethylene porous film (of 12 μm in thickness and 44% in porosity) which was a polyolefin porous film so that the coating solution contained a solid content of 5.6 g per 1 m². A laminate which was the resultant coated product was placed, at 40° C. for 1 minute, in a solidification bath containing water, dimethylacetamide, and tripropylene glycol in a ratio of 50:30:20, and was then washed with the use of ion exchange water, and was then dried with the use of an oven at 80° C., so that a nonaqueous electrolyte secondary battery laminated separator 6 was obtained.

A thickness of the nonaqueous electrolyte secondary battery laminated separator 6 was 15.3 μm and porosity of the porous layer was 50%.

<Production of Nonaqueous Electrolyte Secondary Battery>

A nonaqueous electrolyte secondary battery was produced by a method similar to the method described in Example 1 except that the nonaqueous electrolyte secondary battery laminated separator 6 was used instead of the nonaqueous electrolyte secondary battery laminated separator 1. The nonaqueous electrolyte secondary battery will be referred to as a nonaqueous electrolyte secondary battery 6.

Comparative Example 3

<Preparation of Coating Solution>

A mixture was obtained by adding water to a mixture of 100 parts by mass of alumina fine particles (product name "AKP 3000", manufactured by Sumitomo Chemical Co., Ltd.) and 6 parts by mass of carboxymethyl cellulose (product name "1110", manufactured by Daicel Corporation) so that the mixture had a solid content of 30% by weight. The resultant mixture was twice stirred and mixed with use of a planetary centrifugal mixer (product name "Awatori Rentaro" (registered trademark), manufactured by THINKY) at room temperature, at 2000 rpm, and for 30 sec. to obtain a coating solution 7.

<Production of Nonaqueous Electrolyte Secondary Battery Laminated Separator>

The coating solution 7 thus obtained was applied by the doctor blade method onto a polyethylene porous film (of 16.2 μm in thickness and 53% in porosity) which was a polyolefin porous film so that the coating solution contained a solid content of 6.7 g per 1 m². A laminate which was the resultant coated product was dried at 80° C. for 1 minute, so that a nonaqueous electrolyte secondary battery laminated separator was obtained. The nonaqueous electrolyte secondary battery laminated separator thus obtained will be referred to as a nonaqueous electrolyte secondary battery laminated separator 7. A thickness of the nonaqueous electrolyte secondary battery laminated separator 7 was 18.8 μm and porosity of the porous layer was 50%.

<Production of Nonaqueous Electrolyte Secondary Battery>

A nonaqueous electrolyte secondary battery was produced by a method similar to the method described in Example 1 except that the nonaqueous electrolyte secondary battery laminated separator 7 was used instead of the nonaqueous electrolyte secondary battery laminated separator 1. The nonaqueous electrolyte secondary battery will be referred to as a nonaqueous electrolyte secondary battery 7.

Comparative Example 4

<Production of Nonaqueous Electrolyte Secondary Battery Laminated Separator>

An NMP solution of PVDF resin (polyvinylidene fluoride homo polymer) (product name "L #7305", manufactured by KUREHA CORPORATION, weight-average molecular weight: 1,000,000) was used as a coating solution 8. The coating solution 8 was applied by the doctor blade method onto a polyethylene porous film (of 12 μm in thickness and 44% in porosity) so that the PVDF resin in the coating solution was in an amount of 5.0 g per 1 m². The resultant coated product was immersed in 2-propanol while the coating film was wet with NMP, and left still at −25° C. for 5 minutes, to obtain a laminated porous film. The resultant laminated porous film was immersed in other 2-propanol in an immersion solvent wet state, and left still at 25° C. for 5 minutes, to obtain a laminated porous film. The resultant laminated porous film was dried at 30° C. for 5 minutes to obtain a nonaqueous electrolyte secondary battery laminated separator 8. A thickness of the nonaqueous electrolyte secondary battery laminated separator 8 was 15.5 μm and porosity of the porous layer was 65%.

<Production of Nonaqueous Electrolyte Secondary Battery>

A nonaqueous electrolyte secondary battery was produced in a manner similar to that of Example 1 except that the nonaqueous electrolyte secondary battery laminated separator 8 was used instead of the nonaqueous electrolyte secondary battery laminated separator 1. The resultant nonaqueous electrolyte secondary battery will be referred to as a nonaqueous electrolyte secondary battery 8.

CONCLUSION

The following Table 1 shows the respective physical property values of the nonaqueous electrolyte secondary battery laminated separators 1 through 8 produced in Examples 1 through 4 and Comparative Examples 1 through 4. Table 1 also shows respective capacity maintenance ratios, after 100 cycles, of the nonaqueous electrolyte secondary batteries 1 through 8 produced in Examples 1 through 4 and Comparative Examples 1 through 4.

TABLE 1

|  | Porosity of porous layer [%] | Displacement amount at tenth loading-unloading cycle [μm] | Displacement amount at fiftieth loading-unloading cycle [μm] | Displacement ratio [%] | Capacity maintenance ratio after 100 cycles [%] |
|---|---|---|---|---|---|
| Ex. 1 | 68 | 0.1241 | 0.1162 | 107 | 80 |
| Ex. 2 | 67 | 0.0913 | 0.0854 | 107 | 81 |
| Ex. 3 | 68 | 0.1201 | 0.1166 | 103 | 85 |
| Ex. 4 | 68 | 0.0954 | 0.0887 | 108 | 80 |

TABLE 1-continued

| | Porosity of porous layer [%] | Displacement amount at tenth loading-unloading cycle [μm] | Displacement amount at fiftieth loading-unloading cycle [μm] | Displacement ratio [%] | Capacity maintenance ratio after 100 cycles [%] |
|---|---|---|---|---|---|
| Com. Ex. 1 | 68 | 0.1017 | 0.0882 | 115 | 75 |
| Com. Ex. 2 | 50 | 0.1105 | 0.095 | 116 | 70 |
| Com. Ex. 3 | 50 | 0.1210 | 0.091 | 133 | 73 |
| Com. Ex. 4 | 65 | 0.1066 | 0.085 | 125 | 67 |

Ex. stands for Example.
Com. Ex. stands for Comparative Example.

Table 1 reveals that the nonaqueous electrolyte secondary batteries including the respective nonaqueous electrolyte secondary battery insulating porous layers which were produced in Examples 1 through 4 and whose "ratio of displacement amount at tenth loading-unloading cycle to displacement amount at fiftieth loading-unloading cycle" (displacement ratio) was in a range of not less than 100% and less than 115% are higher in capacity maintenance ratio after 100 cycles than and superior in cycle characteristic to the nonaqueous electrolyte secondary batteries including the respective nonaqueous electrolyte secondary battery insulating porous layers which were produced in Comparative Examples 1 through 4 and whose displacement ratio was out of the above range.

In view of the above, it was revealed that the nonaqueous electrolyte secondary batteries, which included the nonaqueous electrolyte secondary battery insulating porous layers produced in respective Examples 1 through 4, each had an improved cycle characteristic.

INDUSTRIAL APPLICABILITY

A nonaqueous electrolyte secondary battery insulating porous layer in accordance with an embodiment of the present invention allows a nonaqueous electrolyte secondary battery, in which the nonaqueous electrolyte secondary battery insulating porous layer is included, to have an improved cycle characteristic. Therefore, the nonaqueous electrolyte secondary battery insulating porous layer in accordance with an embodiment of the present invention is useful as a member of a nonaqueous electrolyte secondary battery.

REFERENCE SIGNS LIST

1 Planar presser
2 measurement sample

The invention claimed is:

1. A nonaqueous electrolyte secondary battery insulating porous layer comprising a thermoplastic resin,
    porosity of the nonaqueous electrolyte secondary battery insulating porous layer being not less than 25% and not more than 80%,
    a ratio of a displacement amount of the nonaqueous electrolyte secondary battery insulating porous layer at tenth loading-unloading cycle to a displacement amount of the nonaqueous electrolyte secondary battery insulating porous layer at fiftieth loading-unloading cycle being not less than 100% and less than 115%,
    the thermoplastic resin being a mixture of an aromatic polyester and an aromatic polyamide,
    a weight of the aromatic polyester being not less than 20% by weight and not more than 75% by weight with respect to a total weight of the aromatic polyester and the aromatic polyamide being 100% by weight, and
    a thickness of the nonaqueous electrolyte secondary battery insulating porous layer being 0.5 μm to 15 μm.

2. A nonaqueous electrolyte secondary battery laminated separator comprising:
    a polyolefin porous film; and
    a nonaqueous electrolyte secondary battery insulating porous layer recited in claim 1.

3. A nonaqueous electrolyte secondary battery member comprising:
    a cathode;
    a nonaqueous electrolyte secondary battery insulating porous layer recited in claim 1; and
    an anode,
    the cathode, the nonaqueous electrolyte secondary battery insulating porous layer, and the anode being arranged in this order.

4. A nonaqueous electrolyte secondary battery comprising:
    a nonaqueous electrolyte secondary battery insulating porous layer recited in claim 1.

5. A nonaqueous electrolyte secondary battery member comprising:
    a cathode;
    a nonaqueous electrolyte secondary battery laminated separator recited in claim 2; and
    an anode,
    the cathode, the nonaqueous electrolyte secondary battery laminated separator, and the anode being arranged in this order.

6. A nonaqueous electrolyte secondary battery comprising:
    a nonaqueous electrolyte secondary battery laminated separator recited in claim 2.

* * * * *